(12) United States Patent
Beaulieu et al.

(10) Patent No.: US 12,535,369 B2
(45) Date of Patent: Jan. 27, 2026

(54) TACTILE SENSOR COMPRISED OF PRINTABLE LATTICE AND MOLDED COMPLIANT CONDUCTORS

(71) Applicants: Toyota Research Institute, Inc., Los Altos, CA (US); The Board of Trustees of the University of Illinois, Urbana, IL (US)

(72) Inventors: Andrew M. Beaulieu, Somerville, MA (US); Jose Barreiros, Somerville, MA (US); Sean Taylor, Falls Church, VA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 18/217,198

(22) Filed: Jun. 30, 2023

(65) Prior Publication Data

US 2025/0003813 A1    Jan. 2, 2025

(51) Int. Cl.
  *G01L 1/14*      (2006.01)
  *G01L 5/00*      (2006.01)
  *G01L 5/22*      (2006.01)

(52) U.S. Cl.
  CPC ............ *G01L 1/142* (2013.01); *G01L 5/0061* (2013.01)

(58) Field of Classification Search
  CPC ... G01L 1/142; G01L 5/0061; G06F 3/03547; G06F 3/013; G06T 19/20; G06T 19/006; G06T 17/20; G01B 11/022; A47L 11/4011; B60W 30/09; G05D 1/0246; G06N 3/044

See application file for complete search history.

(56) References Cited

U.S. PATENT DOCUMENTS 8,174,372 B2    5/2012   da Costa

FOREIGN PATENT DOCUMENTS

| CN | 110987031 A | * | 4/2020 | ............. G01L 1/142 |
| CN | 113419644 A |   | 9/2021 | |
| WO | 2015048530 A1 |  | 4/2015 | |
| WO | 2020097730 A1 |  | 5/2020 | |
| WO | WO-2023096702 A1 | * | 6/2023 | ............. G01B 13/24 |

OTHER PUBLICATIONS

News (/news-index.aspx); David J. Cross, "3D Printed Sensorized Structures for Soft Robotics", pp. 1-4, (https://www.azosensors.com/news.aspx?newsID=15144), Aug. 11, 2022.

\* cited by examiner

*Primary Examiner* — Brandi N Hopkins
(74) *Attorney, Agent, or Firm* — DINSMORE & SHOHL LLP

(57) ABSTRACT

A sensor includes a base structure with a plurality of ports extending into the base structure, a plurality of cells within the base structure and fluidly coupled to the plurality of ports, and an electrically conductive material disposed within the cells. The sensor device also includes a sensorized lattice structure disposed on the base structure and an electrically conductive layer disposed on top of the sensorized lattice structure.

19 Claims, 8 Drawing Sheets

TACTILE SENSOR COMPRISED OF PRINTABLE LATTICE AND MOLDED COMPLIANT CONDUCTORS

TECHNICAL FIELD

The present disclosure generally relates to optical device systems and, more specifically, dual ring resonator systems for thermal isolation, optical performance, and reduced transmission loss having ring resonators, as well as methods for thermal isolation and reduced transmission loss.

BACKGROUND

Robotic grippers are used to grasp and manipulate objects. One type of gripper is the flexible FinRay gripper that wraps around an object to provide a good grip. It may be desirable to sensorize a flexible robotic gripper to provide feedback to the robot so that it understands the quality of a grip on the object.

SUMMARY

An embodiment of the present disclosure takes the form of a sensor device including a base structure with a plurality of ports extending into the base structure, a plurality of cells within the base structure and fluidly coupled to the plurality of ports, and an electrically conductive material disposed within the cells. The sensor device also includes a sensorized lattice structure disposed on the base structure and an electrically conductive layer disposed on top of the sensorized lattice structure.

A further embodiment takes the form of a sensor device including a base structure with a plurality of ports extending into the base structure, a plurality of cells within the base structure and fluidly coupled to the plurality of ports, and an electrically conductive material disposed within the cells. The sensor device also includes a sensorized lattice structure disposed on the base structure, an electrically conductive layer disposed on top of the sensorized lattice structure, and a processor configured to analyze a contact region in the base structure and lattice structure as a result of contact with an object to provide feedback to a robot regarding contact with the object.

Another embodiment takes the form of a method of sensorizing a flexible structure including injecting electrically conductive material into a plurality of ports of a base structure and into a plurality of individual cells, disposing a lattice structure on top of the base structure, and providing an electrically conductive top plate to the top of the lattice structure. An air gap between the individual cells of the base structure and the top plate create an array of capacitors. The method further includes providing tactile feedback to a robot corresponding to a quality of a grip on an object by measuring capacitance between each individual cell and the top plate.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
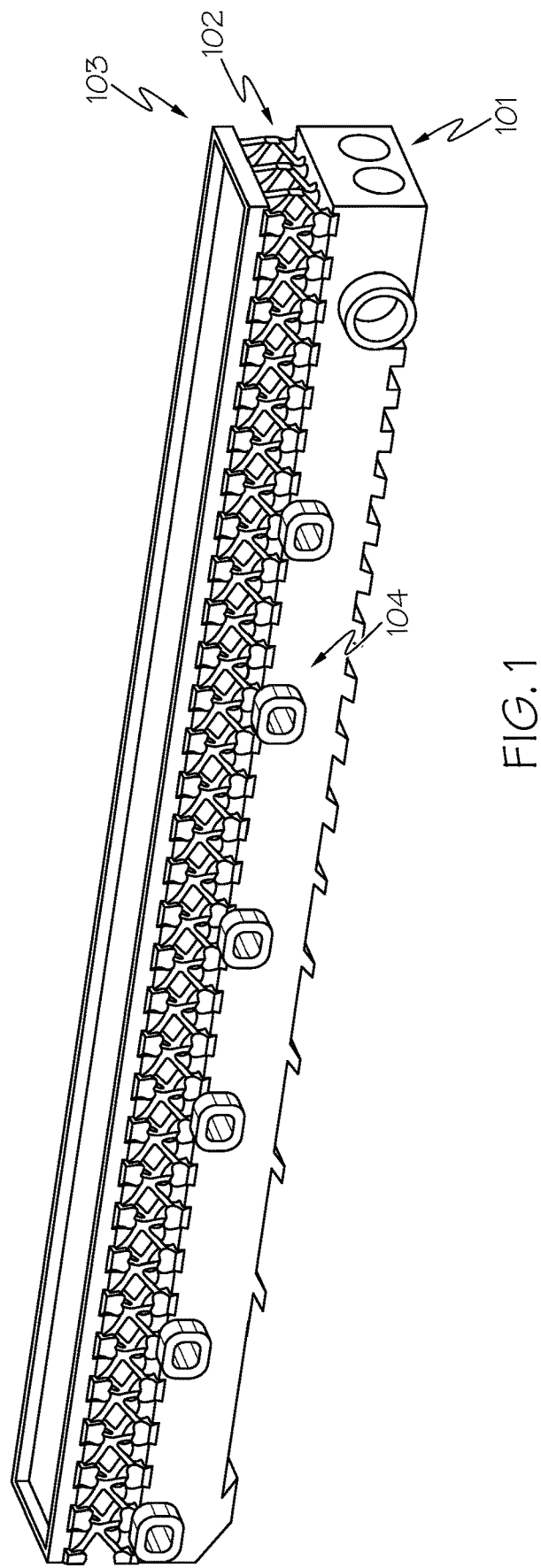
FIG. 1 schematically depicts a perspective view of a tactile sensor, according to one or more embodiments shown and described and illustrated herein.

The present disclosure provides for a robotic gripper used to grasp and manipulate objects. A gripper may wrap around an object to provide a good grip. It may be desirable to a flexible robotic gripper may also be sensorized to provide feedback to the robot so that it understands the quality of a grip on the object. As such, embodiments provide a flexible structure that may be used as a robot gripper that include sensing capabilities.

Referring to FIGS. 1-4, a tactile sensor 100 includes a base structure 101, a lattice structure 102, and a top plate 103. The lattice structure 102 is disposed between the base structure 101 and the top plate 103. The base structure 101 and the lattice structure 102 may be 3D printed using any suitable material. For example the base structure and the lattice structure may be composed of an elastomer (e.g. silicone rubber, polyurethane) such that they are flexible. It should be understood that embodiments of the present disclosure are not limited by the tactile sensor 100 illustrated by FIGS. 1-4 and that other configurations are also possible. The tactile sensor 100 discussed herein may be any suitable tactile sensor capable of identifying characteristics, such as geometry, pose, hardness, flexibility, and the like, of an object contacted.

The base structure 101 includes a plurality of ports 104 extending into the base structure. In embodiments, one or more of the plurality of ports 104 may provide one or more channels 401 for signal wires. The base structure 101 also includes a plurality of cells within the base structure and fluidly coupled to the plurality of ports.

The base structure 101 also includes an electrically conductive material 201 disposed within the cells. The electrically conductive material 201 can be injected into the plurality of ports 104 of base structure 101 and into the plurality of individual cells. An air gap between the individual cells of the base structure 101 and the top plate 103 create an array of capacitors.

The lattice structure 102 is sensorized and disposed on the base structure 101. For example, the lattice structure 102 may be printed on top of the base structure 101.

An electrically conductive layer is disposed on top of the sensorized lattice structure 102. In some embodiments, the electrically conductive layer comprises an electrically conductive material 201 that is doped with carbon black. In some embodiments, the electrically conductive layer is an electrically conductive metal plate disposed on top of the sensorized lattice structure 102.

In some embodiments, the base structure 101 and the lattice structure 102 are composed of a flexible material with a modulus of elasticity from 0.2 to about 20 GPa. In some embodiments, the base structure 101 and the lattice structure 102 are composed of any suitable material. For example the base structure and the lattice structure may be composed of an elastomer (e.g. silicone rubber, polyurethane).

Figure 2A:
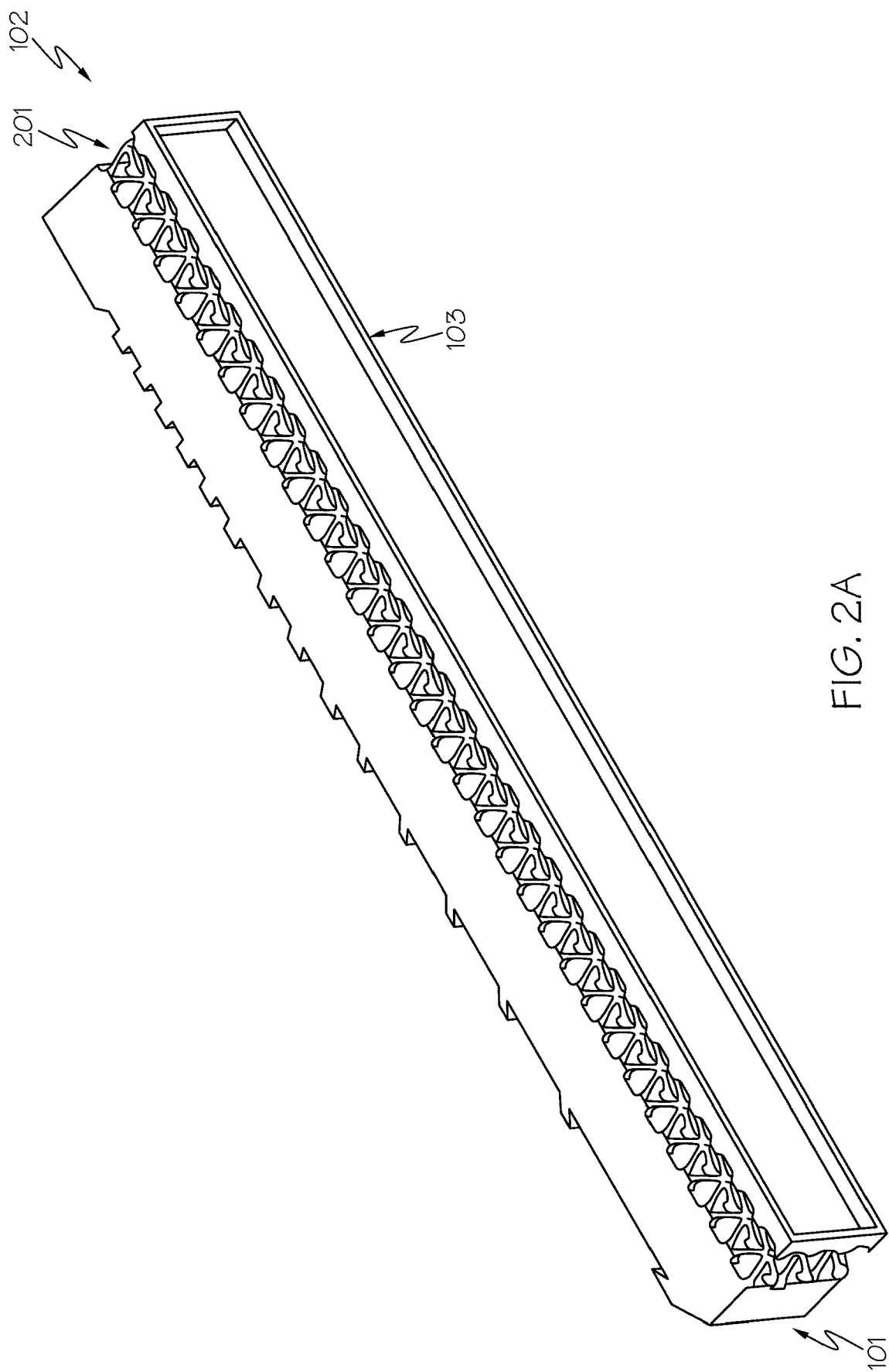
FIGS. 2A and 2B schematically depict pieces in several incarnations to be bonded (or co-molded or overmolded) with the gripper, according to one or more embodiments shown and described and illustrated herein.
Figure 2B:
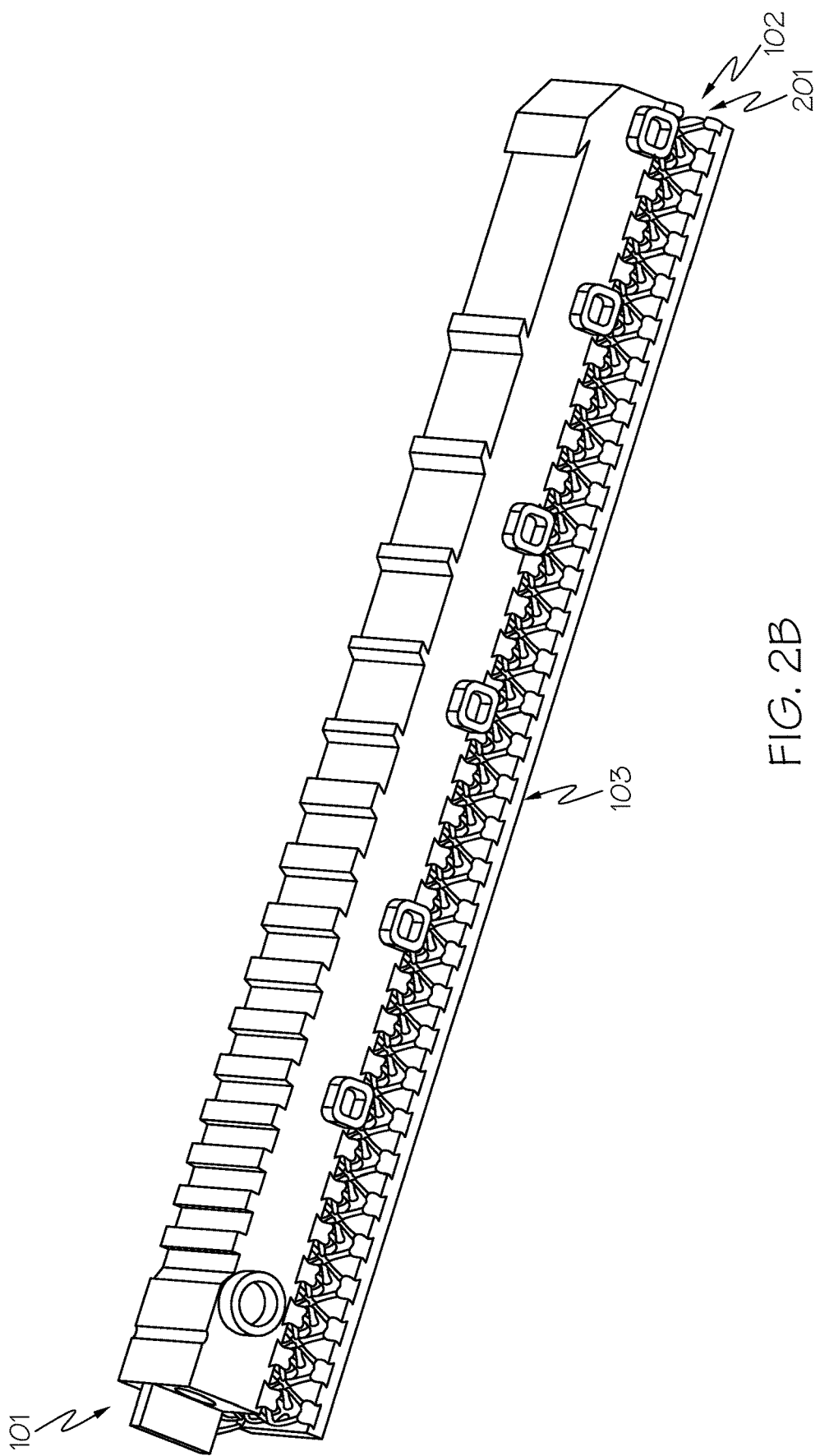

Referring to FIGS. 2A and 2B, pieces of electrically conductive material 201 are shown in several incarnations to be bonded (or co-molded or overmolded) with the gripper. The electrically conductive material may be injected and molded in a plurality of cells. The electrically conductive material 201 may be flexible, such as flexible material that is doped with carbon black.

Figure 3:
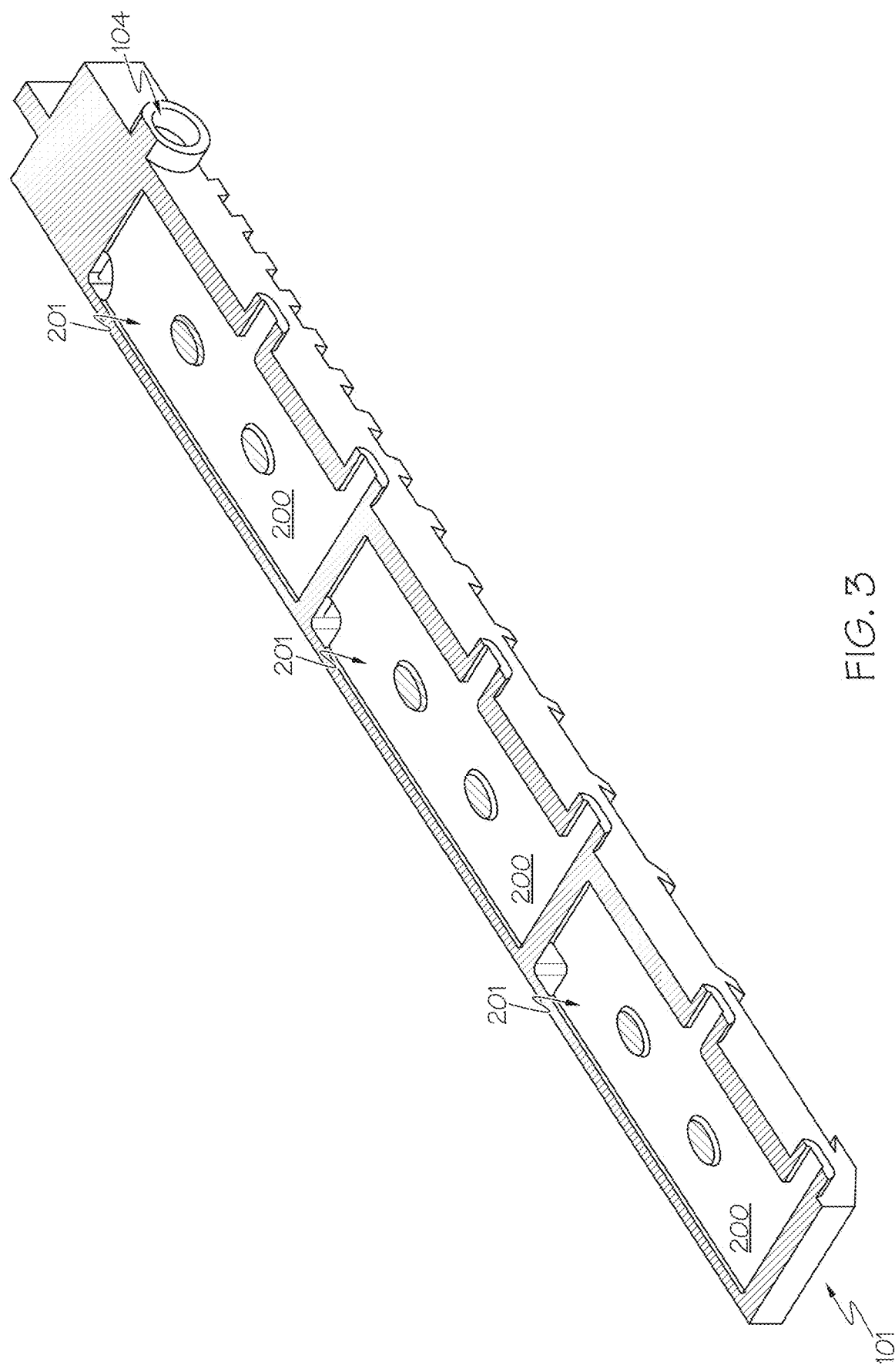
FIG. 3 schematically depicts cutaway view of a tactile sensor, according to one or more embodiments shown and described and illustrated herein.

Referring to FIG. 3, the ports 104 allow the molding of an electrically conductive material 201 in a plurality of cells 200. In alternative embodiments, the electrically conductive material 201 may be a thin electrically conductive plate.

Figure 4:
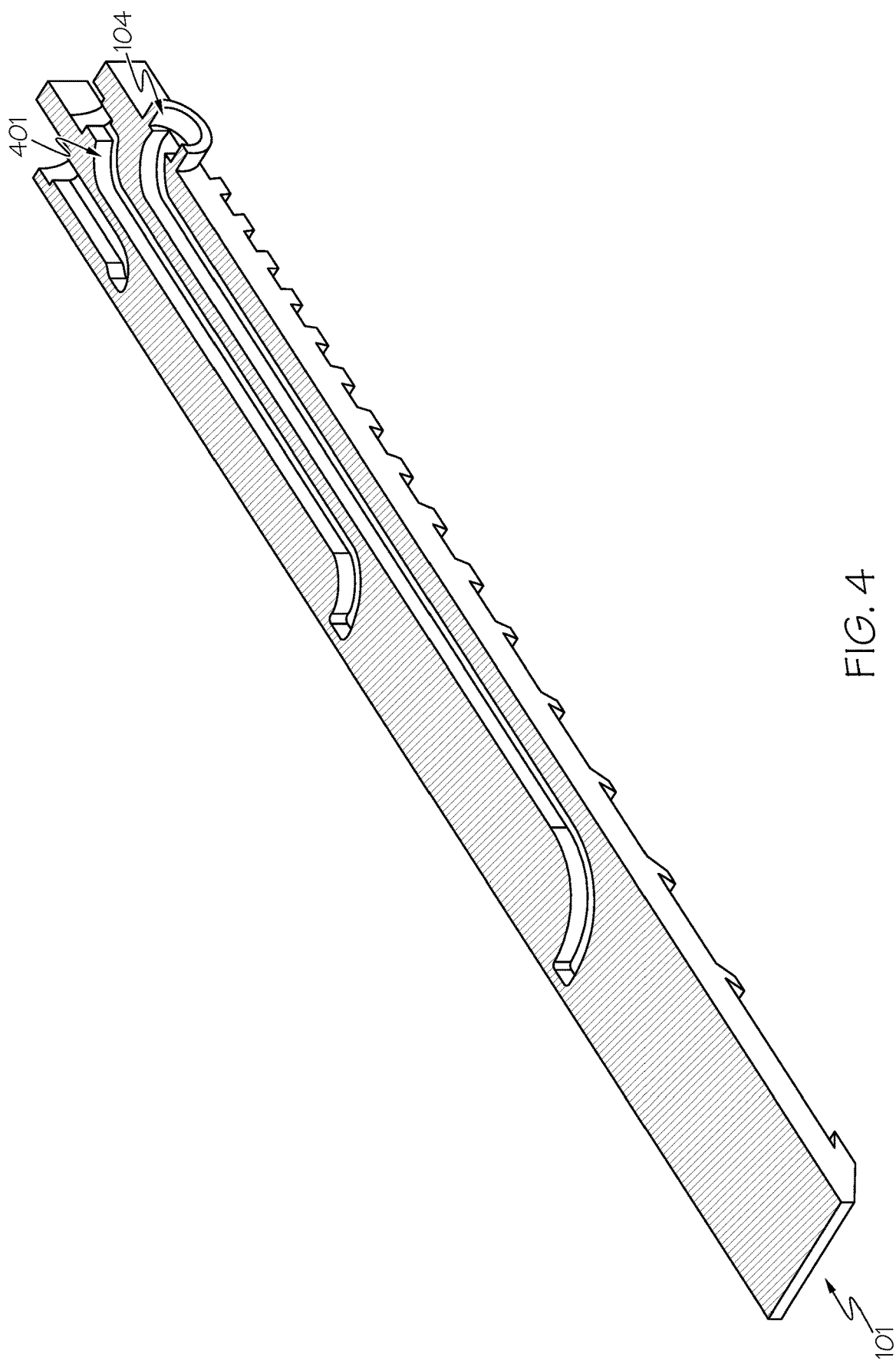
FIG. 4 schematically depicts additional ports of a tactile sensor, according to one or more embodiments shown and described and illustrated herein.

Referring to FIG. 4, ports 104 may also include additional ports in the base structure 101 to not only inject electrically conductive material 201 into the plurality of cells, but also to provide channels 401 for signal wires.

Contact causes the tactile sensor 100 to deform and converts pressure applied into a signal. Based on the specific deformation of the tactile sensor 100, the processor analyzes the contact region in the base structure 101 and lattice structure 102 as a result of contact with an object to provide feedback to a robot regarding contact with the object. The array of capacitors created by the air gap between the individual cells of the base structure 101 and the top plate 103 can be measured and the capacitance between each cell and the top plate 103 may be measured and provide an indication on the state of the entire structure. Thus, the flexible structure may be used in a gripper to provide feedback to the robot regarding contact with an object.

Figure 5:
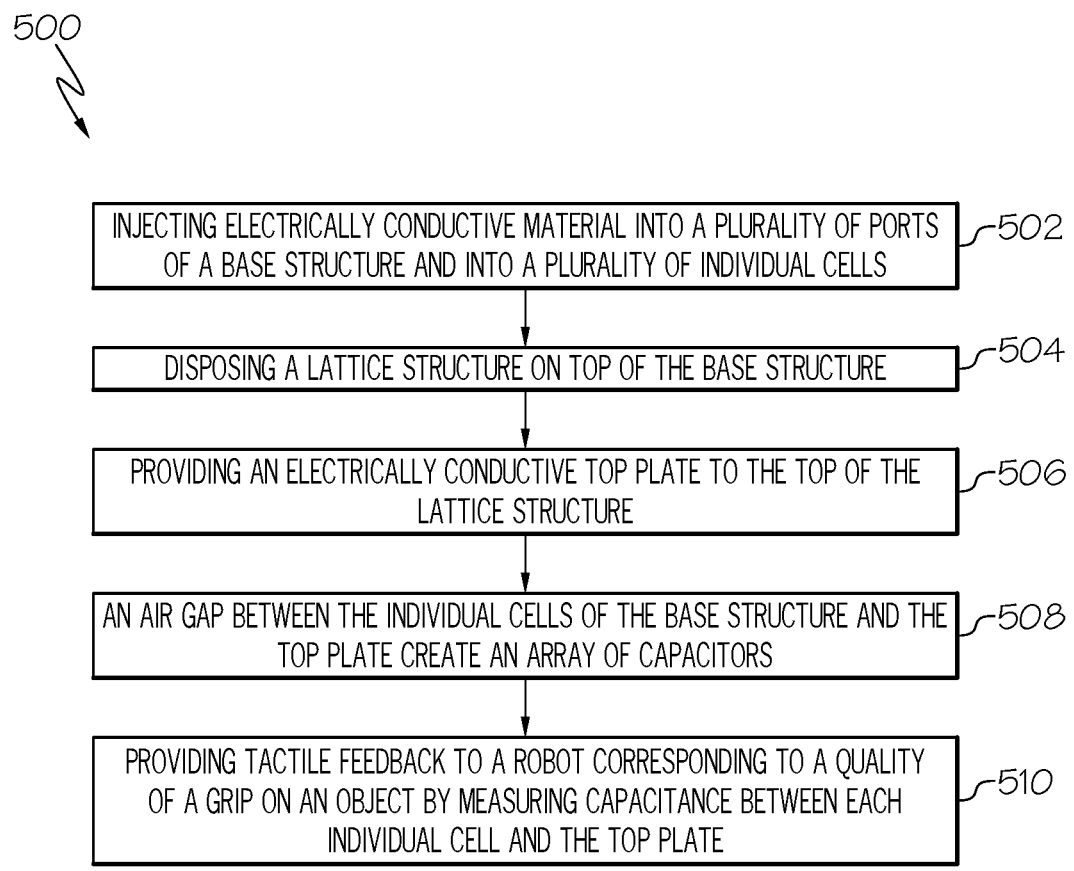
FIG. 5 schematically depicts a flowchart of an exemplary process, according to one or more embodiments shown and described and illustrated herein

Referring to FIG. 5, a flowchart illustrates an exemplary method 500 for sensorizing a flexible structure is shown. However, as discussed herein, reference is made to FIGS. 1-4 illustrating the tactile sensor 100 without limiting the scope of the present disclosure. At block 502 is injecting electrically conductive material 201 into a plurality of ports 104 of a base structure 101 and into a plurality of individual cells. At block 504 is disposing a lattice structure 102 on top of the base structure 101. At block 506 is providing an electrically conductive top plate 103 to the top of the lattice structure 102, wherein, at block 508, an air gap between the individual cells of the base structure 101 and the top plate 103 create an array of capacitors. At block 510 is providing tactile feedback to a robot corresponding to a quality of a grip on an object by measuring capacitance between each individual cell and the top plate 103.

In some embodiments, the lattice structure 102 is doped with carbon black so that, rather than detecting capacitance, changes in resistance between the individual cells and the top plate may be detected. In some embodiments, a processor is configured to analyze a contact region in the base structure 101 and lattice structure 102 as a result of contact with an object to provide feedback to a robot regarding contact with the object.

Figure 6:
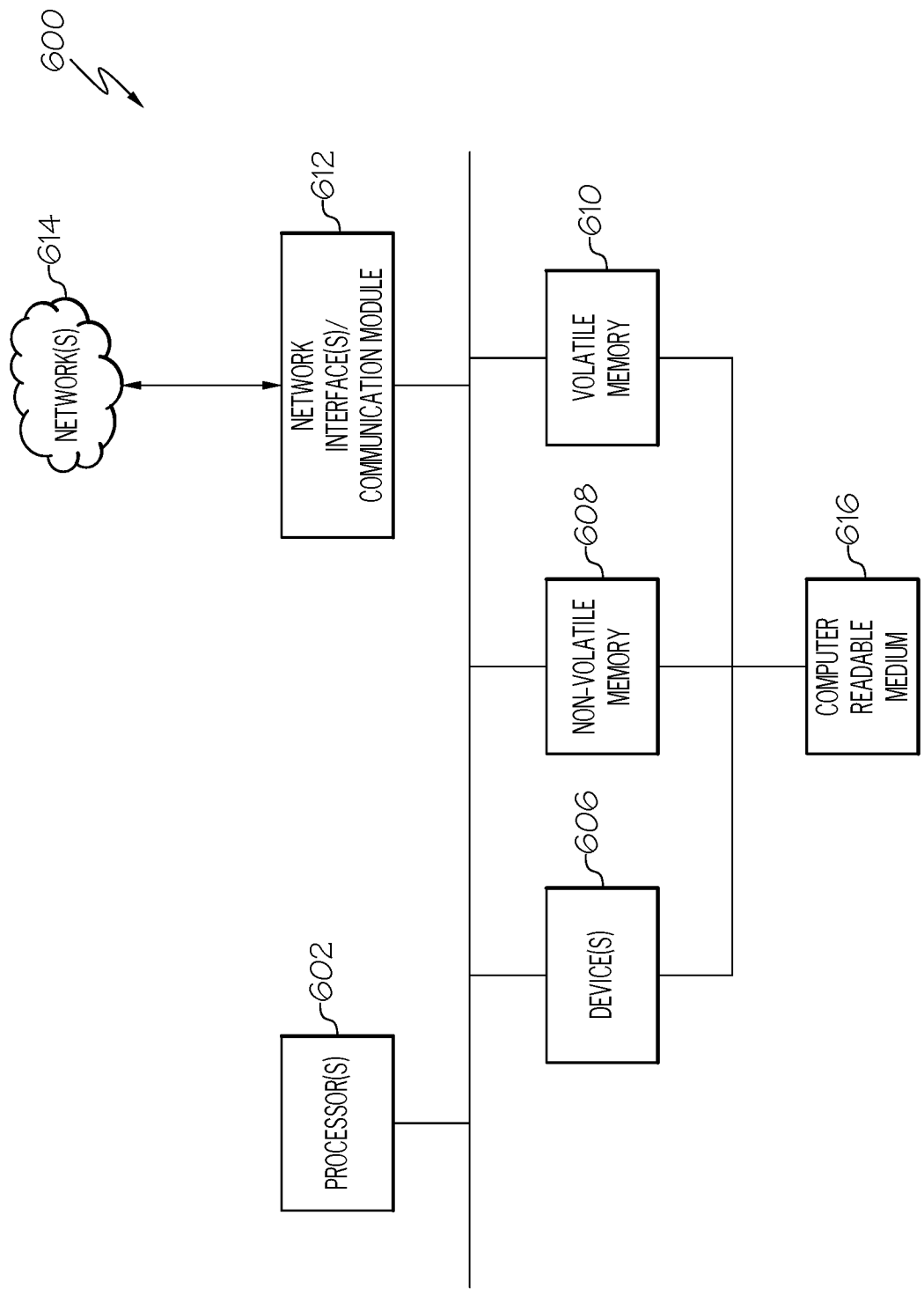
FIG. 6 is a block diagram illustrating computing hardware utilized in one or more devices for implementing various processes and systems, according one or more embodiments described and illustrated herein.

Referring to FIG. 6, environment 600 is depicted. Data may be received via the network 614 and network interface (s)/communication module 612. The data may comprise a plurality of pressure data and a plurality of attributes corresponding to the plurality of pressure data. The data may contain a plurality of features and may be a labeled data set for training a supervised machine learning model.

The processor 602 may perform the steps of providing tactile feedback to a robot corresponding to a quality of a grip on an object by measuring capacitance between each individual cell and the top plate 103.

The signal wires within channels 401 may comprise a combination of conductive traces, conductive wires, connectors, and buses that cooperate to permit the transmission of electrical data signals to components such as processor(s) 602, non-volatile memory 608, volatile memory 610, devices 606, and computer readable medium 616.

Figure 7:
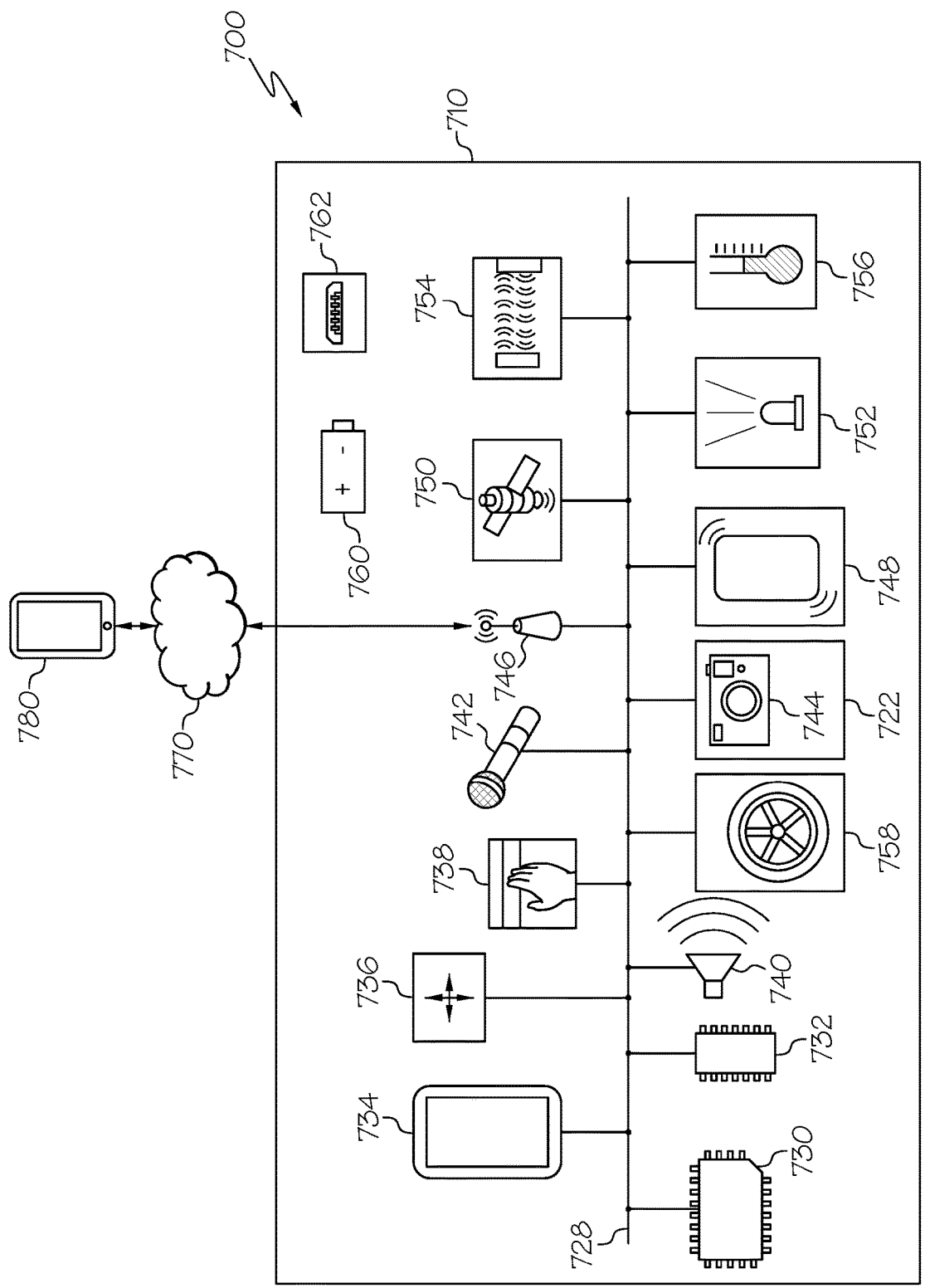
FIG. 7 is a block diagram illustrating hardware utilized in one or more devices for implementing various processes and systems, according one or more embodiments described and illustrated herein.

Referring to FIG. 7, example components of one non-limiting embodiment of a robot 700 that receives feedback regarding contact with an object is schematically depicted. The robot 700 includes a housing 710, a communication path 728, a processor 730, a memory module 732, a tactile display 734, an inertial measurement unit 736, an input device 738, an audio output device 740 (e.g., a speaker), a microphone 742, a camera 744, network interface hardware 746, a tactile feedback device 748, a location sensor 750, a light 752, a proximity sensor 754, a temperature sensor 756, a motorized wheel assembly 758, a battery 760, and a charging port 762. The components of the robot 700 other than the housing 710 may be contained within or mounted to the housing 710. The various components of the robot 700 and the interaction thereof will be described in detail below. However, it should be understood that, in embodiments, the robot 700 may not include some of the described features.

The communication path 728 may be formed from any medium that is capable of transmitting a signal such as, for example, conductive wires, conductive traces, optical waveguides, or the like. Moreover, the communication path 728 may be formed from a combination of mediums capable of transmitting signals. In one embodiment, the communication path 728 comprises a combination of conductive traces, conductive wires, connectors, and buses that cooperate to permit the transmission of electrical data signals to components such as processors, memories, sensors, input devices, output devices, and communication devices. Accordingly, the communication path 728 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 728 communicatively couples the various components of the robot 700. As used herein, the term "communicatively coupled" means that coupled components are capable of exchanging data signals with one another such as, for example, electrical signals via conductive medium, electromagnetic signals via air, optical signals via optical waveguides, and the like.

The processor 730 of the robot 700 may be any device capable of executing machine-readable instructions. Accordingly, the processor 730 may be a controller, an integrated circuit, a microchip, a computer, or any other computing device. The processor 730 may be communicatively coupled to the other components of the robot 700 by the communication path 728. This may, in various embodiments, allow the processor 730 to receive data from the one or more tactile sensors 100 which may be part of the robot 700. In other embodiments, the processor 730 may receive data directly from one or more sensorized structures which are part of one or more tactile sensors 100 on a robot 700. Accordingly, the communication path 728 may communicatively couple any number of processors with one another, and allow the components coupled to the communication path 728 to operate in a distributed computing environment. Specifically, each of the components may operate as a node that may send and/or receive data. While the embodiment depicted in FIG. 7 includes a single processor 730, other embodiments may include more than one processor.

The memory module 732 of the robot 700 is coupled to the communication path 728 and communicatively coupled to the processor 730. The memory module 732 may, for example, contain instructions to detect an amount of pressure of an object that has deformed the tactile sensor 100. In this example, these instructions stored in the memory module 732, when executed by the processor 730, may allow for the determination of the pressure of an object based on the observed deformation. The memory module 732 may comprise RAM, ROM, flash memories, hard drives, or any non-transitory memory device capable of storing machine-readable instructions such that the machine-readable instructions can be accessed and executed by the processor 730. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 1332. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 7 includes a single memory module 732, other embodiments may include more than one memory module.

The tactile display 734, if provided, is coupled to the communication path 728 and communicatively coupled to the processor 730. The tactile display 734 may be any device capable of providing tactile output in the form of refreshable tactile messages. A tactile message conveys information to a user by touch. For example, a tactile message may be in the form of a tactile writing system, such as Braille. A tactile message may also be in the form of pressure feedback. The tactile display 734 may provide information to the user regarding the operational state of the robot 700.

Any known or yet-to-be-developed tactile display may be used. In some embodiments, the tactile display 734 is a three dimensional tactile display including a surface, portions of which may raise to communicate information. The raised portions may be actuated mechanically in some embodiments (e.g., mechanically raised and lowered pins). The tactile display 734 may also be fluidly actuated, or it may be configured as an electrovibration tactile display.

The inertial measurement unit 736, if provided, is coupled to the communication path 728 and communicatively coupled to the processor 730. The inertial measurement unit 736 may include one or more accelerometers and one or more gyroscopes. The inertial measurement unit 736 transforms sensed physical movement of the robot 700 into a signal indicative of an orientation, a rotation, a velocity, or an acceleration of the robot 700. The operation of the robot 700 may depend on an orientation of the robot 700 (e.g., whether the robot 700 is horizontal, tilted, and the like). Some embodiments of the robot 700 may not include the inertial measurement unit 736, such as embodiments that include an accelerometer but not a gyroscope, embodiments that include a gyroscope but not an accelerometer, or embodiments that include neither an accelerometer nor a gyroscope.

One or more input devices 738 are coupled to the communication path 728 and communicatively coupled to the processor 730. The input device 738 may be any device capable of transforming user contact into a data signal that can be transmitted over the communication path 728 such as, for example, a button, a switch, a knob, a microphone or the like. In various embodiments an input device 738 may be a sensorized structure described above. In some embodiments, the input device 738 includes a power button, a volume button, an activation button, a scroll button, or the like. The one or more input devices 738 may be provided so that the user may interact with the robot 700, such as to navigate menus, make selections, set preferences, and other functionality described herein. In some embodiments, the input device 738 includes a pressure sensor, a touch-sensitive region, a pressure strip, or the like. It should be understood that some embodiments may not include the input device 738. As described in more detail below, embodiments of the robot 700 may include multiple input devices disposed on any surface of the housing 710. In some embodiments, one or more of the input devices 738 are configured as a fingerprint sensor for unlocking the robot. For example, only a user with a registered fingerprint may unlock and use the robot 700.

The network interface hardware 746 is coupled to the communication path 728 and communicatively coupled to the processor 730. The network interface hardware 746 may be any device capable of transmitting and/or receiving data via a network 770. Accordingly, network interface hardware 746 can include a wireless communication module configured as a communication transceiver for sending and/or receiving any wired or wireless communication. For example, the network interface hardware 746 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 746 includes hardware configured to operate in accordance with the Bluetooth wireless communication protocol. In another embodiment, network interface hardware 746 may include a Bluetooth send/receive module for sending and receiving Bluetooth communications to/from a portable electronic device 780. The network interface hardware 746 may also include a radio frequency identification ("RFID") reader configured to interrogate and read RFID tags.

In some embodiments, the robot 700 may be communicatively coupled to a portable electronic device 780 via the network 770. In some embodiments, the network 770 is a personal area network that utilizes Bluetooth technology to communicatively couple the robot 700 and the portable electronic device 780. In other embodiments, the network 770 may include one or more computer networks (e.g., a personal area network, a local area network, or a wide area network), cellular networks, satellite networks and/or a global positioning system and combinations thereof. Accordingly, the robot 700 can be communicatively coupled to the network 770 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 770 may be utilized to communicatively couple the robot 700 with the portable electronic device 780. The portable electronic device 780 may include a mobile phone, a smartphone, a personal digital assistant, a camera, a dedicated mobile media player, a mobile personal computer, a laptop computer, and/or any other portable electronic device capable of being communicatively coupled with the robot 700. The portable electronic device 780 may include one or more processors and one or more memories. The one or more processors can execute logic to communicate with the robot 700. The portable electronic device 780 may be configured with wired and/or wireless communication functionality for communicating with the robot 700. In some embodiments, the portable electronic device 780 may perform one or more elements of the functionality described herein, such as in embodiments in which the functionality described herein is distributed between the robot 700 and the portable electronic device 780.

The tactile feedback device 748 is coupled to the communication path 728 and communicatively coupled to the processor 730. The tactile feedback device 748 may be any device capable of providing tactile feedback to a user. The tactile feedback device 748 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 748.

The location sensor 750 is coupled to the communication path 728 and communicatively coupled to the processor 730. The location sensor 750 may be any device capable of generating an output indicative of a location. In some embodiments, the location sensor 750 includes a global positioning system (GPS) sensor, though embodiments are not limited thereto. Some embodiments may not include the location sensor 750, such as embodiments in which the robot 700 does not determine a location of the robot 700 or embodiments in which the location is determined in other ways (e.g., based on information received from the camera 744, the microphone 742, the network interface hardware 746, the proximity sensor 754, the inertial measurement unit 736 or the like). The location sensor 750 may also be configured as a wireless signal sensor capable of triangulating a location of the robot 700 and the user by way of wireless signals received from one or more wireless signal antennas.

The robot 700 is powered by the battery 760, which is electrically coupled to the various electrical components of the robot 700. The battery 760 may be any device capable of storing electric energy for later use by the robot 700. In some embodiments, the battery 760 is a rechargeable battery, such as a lithium-ion battery or a nickel-cadmium battery. In embodiments in which the battery 760 is a rechargeable battery, the robot 700 may include the charging port 762, which may be used to charge the battery 760. Some embodiments may not include the battery 760, such as embodiments in which the robot 700 is powered the electrical grid, by solar energy, or by energy harvested from the environment. Some embodiments may not include the charging port 762, such as embodiments in which the apparatus utilizes disposable batteries for power.

It should now be understood that embodiments of the present disclosure are directed tactile sensors capable of detecting contact with an object as well as a pressure of an object. One or more deformable sensors may be provided on a robot, for example. The information provided by the tactile sensors may then be used to control the robot's interaction with target objects. The depth resolution and spatial resolution of the tactile sensors may vary depending on the location of the deformable sensors on the robot.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sensor device comprising:
   a base structure comprising:

a plurality of ports extending into the base structure,
a plurality of cells within the base structure and fluidly coupled to the plurality of ports, and
an electrically conductive material disposed within the cells;
a sensorized lattice structure disposed on the base structure; and
an electrically conductive layer disposed on top of the sensorized lattice structure, wherein an air gap between the individual cells of the base structure and the top plate create an array of capacitors.

2. The device according to claim 1, wherein the base structure and the lattice structure are composed of a flexible material with a modulus of elasticity from 0.2 to about 20 GPa.

3. The device according to claim 1, wherein the base structure and the lattice structure are composed of an elastomer.

4. The device according to claim 1, wherein the electrically conductive layer comprises an electrically conductive material that is doped with carbon black.

5. The device according to claim 1, wherein the electrically conductive layer is an electrically conductive metal plate disposed on top of the sensorized lattice structure.

6. The device according to claim 1, wherein one or more of the plurality of ports provide one or more channels for signal wires.

7. A sensor device comprising:
a base structure comprising:
  a plurality of ports extending into the base structure,
  a plurality of cells within the base structure and fluidly coupled to the plurality of ports, and
  an electrically conductive material disposed within the cells;
a sensorized lattice structure disposed on the base structure;
an electrically conductive layer disposed on top of the sensorized lattice structure, wherein an array of resistors is formed between the electrically conductive material disposed within the cells and the electrically conductive layer through the sensorized lattice structure; and
a processor configured to analyze a contact region in the base structure and lattice structure as a result of contact with an object to provide feedback to a robot regarding contact with the object.

8. The device according to claim 7, wherein the base structure and the lattice structure are composed of a flexible material with a modulus of elasticity from 0.2 to about 20 GPa.

9. The device according to claim 7, wherein the base structure and the lattice structure are composed of an elastomer.

10. The device according to claim 7, wherein the electrically conductive layer comprises an electrically conductive material that is doped with carbon black.

11. The device according to claim 7, wherein the electrically conductive layer is an electrically conductive metal plate disposed on top of the sensorized lattice structure.

12. The device according to claim 7, wherein one or more of the plurality of ports provide one or more channels for signal wires.

13. The device according to claim 7, wherein the sensorized lattice structure is doped with carbon black.

14. A method of sensorizing a flexible structure comprising:
injecting electrically conductive material into a plurality of ports of a base structure and into a plurality of individual cells;
disposing a lattice structure on top of the base structure;
providing an electrically conductive top plate to the top of the lattice structure, wherein an air gap between the individual cells of the base structure and the top plate create an array of capacitors; and
providing tactile feedback to a robot corresponding to a quality of a grip on an object by measuring capacitance between each individual cell and the top plate.

15. The method according to claim 14, wherein flexible structure are composed of a flexible material with a modulus of elasticity from 0.2 to about 20 GPa.

16. The method according to claim 14, wherein the base structure and the lattice structure are composed of an elastomer.

17. The method according to claim 14, wherein the base structure comprises an electrically conductive material that is doped with carbon black.

18. The method according to claim 14, wherein the base structure comprises an electrically conductive metal plate disposed on top of the sensorized lattice structure.

19. The method according to claim 14, wherein one or more of the plurality of ports provide one or more channels for signal wires.

* * * * *